United States Patent Office 3,013,701
Patented Dec. 19, 1961

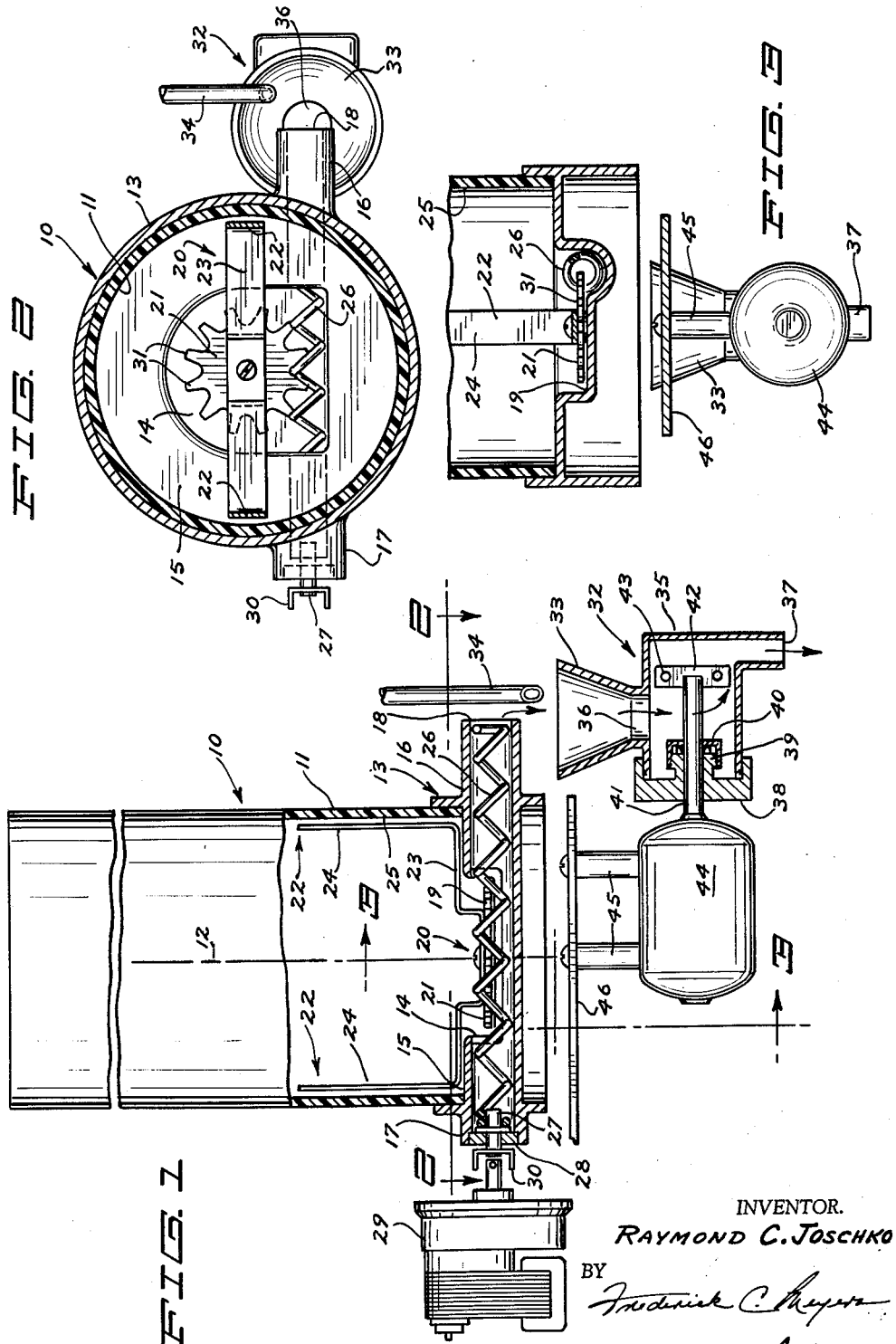

3,013,701
APPARATUS FOR MIXING POWDERED BASE
AND LIQUID TO PRODUCE A BEVERAGE
Raymond C. Joschko, Minneapolis, Minn., assignor to Vendomatic Sales, Inc., Minneapolis, Minn., a corporation of Minnesota
Filed May 29, 1958, Ser. No. 738,744
1 Claim. (Cl. 222—227)

This invention relates to the making and vending of beverages, and more particularly to apparatus for handling and mixing a powdered drink base and a liquid to produce individual portions of a beverage.

In the mixing of beverages from powdered base, the nature of the base is usually such that it is hygroscopic and cohesive and tends to bridge across its container and passageways. Further, the apparent density of the powder may vary considerably from time to time. Where the mixing equipment is automatic, it is difficult to duplicate identical charges of the powdered beverage. Since the quantity of liquid is constant for each serving, the concentration of the beverage will vary if the charge of powder varies. In some instances, there has been proposed a method of stirring the powder in its container immediately above the discharge to insure a continuous feed of powder. Channeling of the powdered material can easily result from such practice and, although movement of the powder is insured, the last powder to be added may be the first to channel through to the feed mechanism. If other older material is allowed to accumulate, the beverage may lose its strength and flavor.

It is an important object of the present invention to overcome the above noted difficulties and to provide a beverage mixing apparatus which will be simple and inexpensive in construction, yet will be consistently reliable in mixing and dispensing beverages from powdered base.

Another object of the invention is to provide a hopper construction which is equipped with mechanism for handling a uniform charge of powdered material for mixing into a beverage and, at the same time, agitating the powder in such a manner as to cause substantially all of the powder to advance toward the discharge.

A further object of the invention is to provide special bottom design for the hopper which will permit an auger to directly drive an agitator within the hopper without permitting areas to exist which will permit accumulation and stagnation of powder material.

These and other objects and advantages of the invention will more fully appear from the following description, made in connection with the accompanying drawings, wherein like reference characters refer to the same parts throughout the several views and in which:

FIGURE 1 is a side elevation of the beverage mixing and dispensing apparatus, portions unessential to the invention being deleted from the view and other portions being shown in vertical section;

FIGURE 2 is a horizontal section of the hopper base taken on the line 2—2 of FIGURE 1; and FIGURE 3 is a random vertical section of the lower portion of the apparatus taken on the line 3—3 of FIGURE 1.

With continued reference to the drawing, the beverage retaining and dispensing apparatus has a hopper shown generally at 10 which has a circular cross section, being cylindrical in the form shown, so as to provide a side wall portion 11 disposed about a vertical axis 12. The hopper has a base structure 13 which constitutes a bottom for the hopper 10 and further is provided with a well 14 which lies substantially centrally of the cylindrical side wall structure 11 and has the common axis 12. An annular shoulder portion 15 joins the side walls 11 with the well 14 in a smooth and continuous manner as shown in FIGURE 1.

Also forming a part of the base 13 is a conduit or housing 16 which lies radially outward from the axis 12 and joins with the well 14. The conduit 16 is so positioned as to lie below the shouldered area 15 as illustrated in FIGURE 1. Conduit 16 provides an auger housing which extends through the base 13 and outwardly of side wall structure 11, one end thereof being drive end 17 and the other end providing a discharge spout 18.

Lying within the well 14 and closely adjacent the upper surface 19 thereof is a powder agitator indicated generally at 20. The powder agitator, in turn, has a geared portion such as the toothed disc 21 and agitator bar means which may be in the form of upstanding fingers 22 rigidly secured therewith for rotation within the hopper 10. In order to prevent the accumulation of sticky powdered material at any area within the hopper 10, the fingers 22 are so fashioned as to be first bent upwardly and outwardly at 23 and then upwardly at 24, thus overlying the annular shoulder 15 and the conduit 16 in closely adjacent manner and in proximity to the inner surface 25 of the side wall structure 11.

Positioned within the conduit or housing 16 is an auger member 26 which may be constructed simply of a spiral wire or bar as shown. The auger 26 is secured at the drive end 17 to a stub shaft 27 which, in turn, extends outwardly through the closed end 28 of the housing 16. An auger motor 29 is suitably coupled at 30 to the stub shaft 27 for driving the auger in a counterclockwise direction as viewed in FIGURE 3. The auger 26 is pitched so as to mesh with gear teeth 31 circumferentially formed on the toothed disc 21, as shown in FIGURE 2.

Immediately underlying the discharge spout 18 is the beverage maker 32. The upstanding funnel 33 forming a part thereof is adapted to receive powdered base from the discharge 18 and also to receive liquid through the inlet pipe 34. The pipe 34 may be disposed angularly to swirl around the inner surface of the funnel 33. Mixing chamber 35 communicates with the funnel 33 through the inlet opening 36 and is provided with a downwardly directed outlet 37 which is laterally off-set with respect to the inlet 36, as shown in FIGURE 1. Mixing chamber 35 is provided with a cap element 38 which has a bearing 39 and a seal assembly 40 for permitting shaft 41 to rotate in liquid-tight relation with respect to the mixing chamber 35. An impeller blade 42 is secured to the shaft 41 within mixing chamber 35 and may be provided with openings 43 which will tend to aerate the beverage as it is mixed. It is to be noted that the impeller blade 42 lies at a lateral location between the inlet 36 and outlet 37 so as not to directly impel liquid into either of the inlet or outlet openings.

An impeller drive motor 44 is drivably affixed to the shaft 41 and may be mounted on suitable struts 45 which, in turn, are secured to a frame member 46 rigidly positioned with respect to the hopper 10 through supporting structure (not shown).

The operation of the beverage vending equipment will be evident from the foregoing description and, hence, will not require a detailed explanation. It is to be noted, however, that auger 26 picks up the powdered beverage base within the hopper 10 and moves it outwardly to the discharge spout 18 as long as the auger motor 29 is energized. The auger housing 16, being depressed below the annular shouldered portion 15, permits the agitating fingers 22 to rotate not only closely adjacent the bottom structure and side wall structure of the hopper but also rotates in clearance with the auger itself. The result is to continuously supply fresh beverage base to the auger and to maintain a constant apparent density of the same.

Liquid such as hot water may be fed from the pipe 34 into funnel 33 just prior to the initiation of auger rotation so as to wet the inside of the funnel. The liquid then continues to flow therein while the impeller motor 44 is energized and the auger motor 29 is likewise energized. When the proper quantity of powdered base has been discharged through the discharge spout 18, the motor 29 will become de-energized and the impeller motor 44 will continue to operate as the last bit of liquid is discharged through pipe 34. The result of this operation will be to thoroughly intermix the components of the beverage and, at the same time, sweep the mixing chamber 35 and associated parts clean of any residual beverage.

It will, of course, be understood that various changes may be made in the form, details, arrangements and proportions of the parts without departing from the scope of my invention as set forth in the appended claim.

What is claimed is:

A powdered beverage base dispensing mechanism comprising a cylindrical hopper, a base structure forming a bottom for said hopper, said hopper bottom including a well and an annular shoulder portion joining the well to the cylindrical hopper, an auger housing disposed adjacent one side of said well and in communication therewith to receive a powdered base therefrom, said housing having an outlet located outwardly of said hopper, a powder agitator gear disposed in said well and extending into said housing, an agitator bar fixed to said agitator gear for rotational movement therewith, said agitator bar having a horizontal portion adapted to sweep said annular shoulder portion of said hopper bottom and a vertical portion for sweeping the wall of said hopper, and an auger extending substantially the length of said auger housing intermeshing with said agitator gear for rotating said gear and agitator bar to simultaneously agitate and stir the powder the base in said hopper to feed it into said well and said auger housing to insure a continuous feed of fresh powder to said housing outlet.

References Cited in the file of this patent

UNITED STATES PATENTS

| | | |
|---|---|---|
| 412,061 | Allen | Oct. 1, 1889 |
| 1,659,254 | Finger | Feb. 14, 1928 |
| 1,960,778 | Goss et al. | May 29, 1934 |
| 2,688,470 | Marco | Sept. 7, 1954 |
| 2,832,510 | Hill | Apr. 29, 1958 |